US005762899A

United States Patent [19]
Stetzer et al.

[11] Patent Number: 5,762,899
[45] Date of Patent: Jun. 9, 1998

[54] PROCESS FOR DESULFURIZING A H₂S-CONTAINING GAS

[75] Inventors: Klaus Stetzer, Dreieich; Wolfgang Willing, Wöllstadt, both of Germany

[73] Assignee: Metallsgesellschaft Aktiengesellschaft, Frankfurt am Main, Germany

[21] Appl. No.: 886,712

[22] Filed: Jul. 1, 1997

Related U.S. Application Data

[63] Continuation of Ser. No. 609,169, Mar. 1, 1996, abandoned.

[30] Foreign Application Priority Data

Mar. 3, 1995 [DE] Germany .................. 195 07 440.8

[51] Int. Cl.⁶ ...................... B01D 53/48; B01D 53/52
[52] U.S. Cl. .............. 423/573.1; 423/224; 423/230; 423/244.09; 423/574.1; 423/576.2
[58] Field of Search ............... 502/517; 423/230, 423/567.1, 573.1, 576.2, 224, 244.09, 574.1

[56] References Cited

U.S. PATENT DOCUMENTS

| | | | |
|---|---|---|---|
| 1,984,971 | 12/1934 | Herold et al. | 423/576.2 |
| 3,637,352 | 1/1972 | Bratzler et al. | 423/564.1 |
| 5,152,970 | 10/1992 | van der Wal et al. | 423/230 |
| 5,256,384 | 10/1993 | Rolke et al. | 423/220 |

FOREIGN PATENT DOCUMENTS

| | | |
|---|---|---|
| 0 332 373 A3 | 9/1989 | European Pat. Off. . |
| 0 506 160 A1 | 9/1992 | European Pat. Off. . |
| 1567774 | 8/1970 | Germany . |
| 282508 | 12/1927 | United Kingdom ............. 423/573.1 |
| 1151316 | 5/1969 | United Kingdom . |
| WO 92/02449 | 2/1992 | WIPO . |

*Primary Examiner*—Gary P. Straub
*Assistant Examiner*—Timothy C. Vanoy
*Attorney, Agent, or Firm*—Sprung Kramer Schaefer & Briscoe

[57] ABSTRACT

The H₂S-containing gas is passed through at least one bed of a catalyst rich in metal oxide and subsequently through a final cleaning bed. On the catalyst rich in metal oxide and in the final cleaning bed elementary sulfur is deposited, which is removed by a regeneration treatment carried out periodically. The final cleaning bed constitutes a filter bed for the adsorption of elementary sulfur and consists of a granular adsorbent, which is different from the catalyst rich in metal oxide. A gas coming from the catalyst rich in metal oxide is supplied to the filter bed at temperatures in the range from 20° to 180° C., which gas contains at least 250 mg elementary sulfur per Nm³ gas. From the filter bed a desulfurized gas is withdrawn, whose content of elementary sulfur is not more than 30% of the content of elementary sulfur when entering the filter bed.

5 Claims, 1 Drawing Sheet

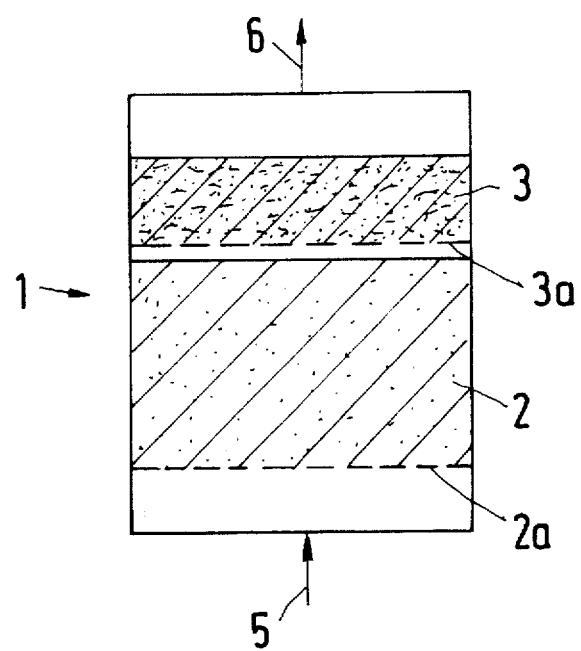

PROCESS FOR DESULFURIZING A H₂S-CONTAINING GAS

This application is a continuation of application Ser. No. 08/609,169, filed on Mar. 1, 1996 now abandoned.

BACKGROUND OF THE INVENTION

1. Field of the Invention

This invention relates to a process for desulfurizing a $H_2S$-containing gas, where the gas is passed through at least one bed of a catalyst rich in metal oxide, and then through a final cleaning bed, where on the catalyst rich in metal oxide and in the final cleaning bed elementary sulfur is deposited, which is removed by means of a regeneration treatment carried out periodically.

2. Description of the Prior Art

Such a process is described in U.S. Pat. No. 5,256,384 (corresponding to DE-A-41 09 892). In the final cleaning bed, $H_2S$ is catalytically converted with $SO_2$ and/or $O_2$ to form elementary sulfur. The achievable residual content of sulfur compounds in the cleaned gas is determined by the thermodynamic balance under the existing operating conditions. In addition, the catalyst in the final cleaning bed is capable of binding elementary sulfur. However, due to the increasing sulfur loading of the catalyst, its catalytic activity and also its capability of adsorbing further elementary sulfur are impaired. In the known process, the cleaned gas therefore has a disturbing residual content of vaporous and/or aerosol-like sulfur. The regeneration treatment must therefore be carried out at relatively short intervals.

SUMMARY OF THE INVENTION

The object underlying the invention is to provide for a very low residual content of sulfur in the cleaned gas in the above-mentioned process, and at the same time to operate the bed of the catalytic conversion with a high loading of sulfur. On the whole, this should reduce the operating costs of such process. In accordance with the invention this is achieved in that the final cleaning bed constitutes a filter bed for the adsorption of elementary sulfur, that the filter bed consists of a granular adsorbent which is different from the catalyst rich in metal oxide, that a gas coming from the catalyst rich in metal oxide is supplied to the filter bed at temperatures in the range from 20° to 180° C., which gas contains at least 250 mg elementary sulfur per $Nm^3$ gas, and that from the filter bed a desulfurized gas is withdrawn, whose content of elementary sulfur is not more than 30% of the content of elementary sulfur when entering the filter bed. ($Nm^3$=standard cubic meter).

DETAILED DESCRIPTION OF THE DRAWING

The drawing represents a reactor and catalyst bed according to the present invention.

DETAILED DESCRIPTION OF THE INVENTION

Suitable adsorbents for the filter bed include in particular activated carbon, activated coke or also zeolites. When the filter bed consists of 60 to 100 wt-% granular activated carbon, it is recommended to use an activated carbon with a specific surface according to BET of 500 to 2500 $m^2/g$, and preferably 1000 to 1500 $m^2/g$. Such activated carbon usually has a bulk density of 200 to 800 $kg/m^3$, and preferably 300 to 500 $kg/m^3$, with grain sizes usually in the range from 1 to 8 mm. When the filter bed largely or totally consists of activated coke, grain sizes in the range from 0.5 to 5 mm, specific surfaces (according to BET) of 200 to 500 $m^2/g$, and bulk densities of 200 to 800 $kg/m^3$ are recommended. The adsorbent can also be provided with an impregnation. Such impregnation can for instance improve the hydrophobic properties of the adsorbent. For zeolites, the hydrophobicity can be achieved in the known manner by dealuminizing.

The catalyst rich in metal oxide, as it is used in this process, preferably is selected from among known catalysts on the basis of $Al_2O_3$ or $TiO_2$ (see e.g. U.S. Pat. No. 5,256,384). These catalysts can in addition be impregnated with about 0.5 to 5 wt-% iron, cobalt or nickel, as this is also described in U.S. Pat. No. 5,256,384. The catalytic conversion of $H_2S$ in the presence of these catalysts rich in metal oxide is usually carried out at temperatures from 100° to 180° C., where $H_2S$ is largely converted with $SO_2$ and/or $O_2$ to form elementary sulfur.

For regeneration purposes, the catalyst rich in metal oxide, which is loaded with elementary sulfur, is treated in the known manner at temperatures of 200° to 400° C. with a regeneration fluid, e.g. steam, hydrogen, methane or also a $H_2S$-containing gas. In basically the same way, the loaded filter bed can be regenerated. Details of the regeneration treatment are described in U.S. Pat. No. 5,256,384. Expediently, the catalyst and the filter bed are regenerated together.

With the process in accordance with the invention, the important advantage is achieved that the bed of the catalyst rich in metal oxide can be loaded with elementary sulfur to a rather high degree, before the bed must be regenerated. The loading of the catalyst with elementary sulfur can be at least 30 wt-%, and preferably 40 to 80 wt-%, with reference to the unloaded catalyst, before regeneration is effected.

The gas supplied to the filter bed still contains at least 250 mg elementary sulfur per $Nm^3$, and usually at least 350 mg elementary sulfur per $Nm^3$. This sulfur is absorbed in the filter bed for at least 70%, and preferably for at least 80%, so that a virtually sulfur-free gas leaves the filter bed. For the filter bed a bed height of 5 to 80 cm, and preferably 10 to 40 cm is recommended. As regards the material for the filter bed, its capability of binding elementary sulfur is decisive. Activated carbon or also activated coke are quite useful for this purpose, also because the costs for these materials are relatively low. At the same time, they can easily be regenerated.

The material of the filter bed need not have a catalytic activity for the conversion of $H_2S$ into elementary sulfur, so that a virtually $O_2$-free gas can be supplied to the filter bed. Usually, the residual $O_2$-content of the gas supplied to the filter bed will be not more than 5 $mg/Nm^3$.

Embodiments of the process will be explained with reference to the drawing.

In a reactor 1 a catalyst bed 2 and a filter bed 3 are each disposed on perforated trays 2a and 3a, respectively. The gas to be treated, which contains $H_2S$ and in addition $SO_2$ and/or $O_2$, is supplied through line 5 and first of all flows through the bed 2. This bed is formed by a granular catalyst rich in metal oxide, e.g. a catalyst on the basis of $Al_2O_3$ or $TiO_3$. According to the reaction equations

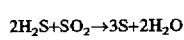

and

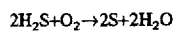

elementary sulfur is formed at temperatures of usually 100° to 180° C. and in part adsorbed on the catalyst. The gas largely liberated from $H_2S$, which still contains, however, vaporous and/or aerosol-like elementary sulfur, is passed through the filter bed 3 for further cleaning, where most of the sulfur is bound by adsorption. For the filter bed 3 temperatures in the range from 20° to 180° C. are recommended, and the temperatures will usually be in the range from 50° to 150° C. Cleaned gas leaves the reactor 1 through line 6, and its content of elementary sulfur will usually be not more than 150 mg/$Nm_3$.

The regeneration of the catalyst bed 2 and the filter bed 3 can expediently be effected together. For this purpose, a hot regeneration fluid, e.g. steam or residual gas ("tailgas") from a Claus plant, at temperatures of 200° to 400° C. is passed through the two beds 2, 3 one after the other, and preferably countercurrently to the direction of loading.

EXAMPLE

The residual gas ("tailgas") from a Claus plant is obtained in an amount of 20500 $Nm^3$/h at a temperature of 125° C. and a pressure of 1.26 bar, and its content of elementary sulfur (S), $H_2S$ and $SO_2$ is indicated in column A of Table 1:

TABLE 1

|  | A | B | C |
|---|---|---|---|
| $H_2S$ (ppm) | 2880 | 539 | 552 |
| $SO_2$ (ppm) | 1440 | 270 | 233 |
| S (mg/$Nm^3$) | 971 | 350 | 65 |

The residual gas flows in upward direction through a bed having a height of 1.5 m, which consists of granular $Al_2O_3$ catalyst impregnated with 1 wt-% Ni. When leaving the catalyst bed, the gas still has the sulfur components indicated in column B of Table 1, if the catalyst was freshly regenerated. This gas is passed upwardly through a filter layer having a height of 30 cm, which is disposed on a wire gauze and consists of activated carbon. The activated carbon has a bulk density of 385 g/l and a BET surface of 1200 $m^2$/g. The gas leaving the filter layer has the sulfur components indicated in column C of Table 1.

In the case of an extended operation and an increasing loading of the catalyst bed with elementary sulfur, the content of elementary sulfur both in the gas coming from the catalyst bed—see Table 2, line B—and in the gas coming from the filter layer, see Table 2, line C, will also be increasing.

TABLE 2

|  | Operating time (h) | | | | | | |
|---|---|---|---|---|---|---|---|
|  | 0 | 5 | 10 | 15 | 20 | 25 | 30 |
| B: S-content (mg/$Nm^3$) | 350 | 443 | 545 | 678 | 899 | 958 | 965 |
| C: S-content (mg/$Nm^3$) | 65 | 68 | 70 | 72 | 73 | 75 | 79 |

The regeneration of the loaded catalyst bed, which contains 0.32 kg elementary sulfur per kg catalyst, is effected after 55 operating hours. At the same time, the filter bed loaded with 0.48 kg elementary sulfur per kg activated carbon is regenerated. The regeneration of the two beds is effected together in one step, where uncleaned residual gas of 300° C. is passed downwards through the beds, and the gas is subsequently cooled for condensing the sulfur absorbed. The regeneration is terminated when the beds have reached the temperature of 300° C. Due to the regeneration with subsequent cooling, the activity of the catalyst and also the adsorption capacity of the filter bed are restored.

We claim:

1. A process for desulfurization a $H_2S$-containing gas which contains $SO_2$ and/or $O_2$, said process comprising a) passing said gas through at least one bed of a catalyst consisting of at least 60 percent by weight $Al_2O_3$ or $TiO_2$, reacting said $H_2S$ with said $SO_2$ and/or $O_2$ in said bed at temperatures in the range of 100° to 180° C. to form elementary sulfur and a partially desulfurized gas, a portion of said elementary sulfur being bound by adsorption in said catalyst bed, b) withdrawing from said catalyst bed said partially desulfurized gas, said gas containing at least 350 mg elementary sulfur per standard cubic meter, feeding said partially desulfurized gas at temperatures in the range from 20° to 180° C. to a filter bed, the gas being introduced into said filter bed having an $O_2$-content of not more than 5 mg per standard cubic meter with no further $O_2$-containing gas being introduced into said filter bed, the height of said filter bed being in the range of 10 to 40 cm, adsorbing in said filter bed at least 80% of the elementary sulfur introduced into said filter bed, said filter bed being a bed of grainy solids selected from the group consisting of b1) activated carbon having a specific surface according to BET of 500 to 2500 $m^2$/g, b2) activated coke having a specific surface according to BET of 200 to 500 $m^2$/g, and b3) zeolite; and c) loading said catalyst bed of step (a) with at least 40 percent by weight of elementary sulfur, said percentage being based on the weight of an unloaded catalyst, and regenerating said loaded catalyst bed and removing said elementary sulfur from said bed by a hot regeneration fluid.

2. A process according to claim 1, wherein said grainy solids of said filter bed is activated carbon having a specific surface according to BET of 500 to 2500 $m^2$/g.

3. A process according to claim 1, wherein said grainy solids of said filter bed is activated coke having a specific surface according to BET of 200 to 500 $m^2$/g.

4. A process according to claim 1, wherein said grainy solids of said filter bed is activated zeolite.

5. The process as claimed in claim 1, wherein the filter bed and the catalyst are regenerated together by passing a hot regeneration fluid through the two beds one after the other.

* * * * *